United States Patent [19]

Carleton

[11] Patent Number: 5,005,109
[45] Date of Patent: Apr. 2, 1991

[54] DETACHABLE AMBER LENS FOR A VEHICLE

[76] Inventor: Roland A. Carleton, 38241 Southfarm, Northville, Mich. 48167

[21] Appl. No.: 559,833
[22] Filed: Jul. 30, 1990
[51] Int. Cl.$^5$ ............................................. B60Q 1/00
[52] U.S. Cl. .................................... 362/61; 362/317; 362/398
[58] Field of Search ................ 362/61, 214, 398, 317, 362/318, 433, 434, 435

[56] References Cited

U.S. PATENT DOCUMENTS

| | | | |
|---|---|---|---|
| 2,530,685 | 11/1950 | Davis et al. | 362/317 |
| 2,544,378 | 3/1951 | Cyr | 362/317 |
| 2,539,819 | 1/1951 | Dominick | 362/317 |
| 3,609,345 | 9/1971 | Perkiss | 362/317 |
| 3,836,766 | 9/1974 | Auerbach | 362/398 |
| 4,225,904 | 9/1980 | Linder | 362/398 |

*Primary Examiner*—James C. Yeung
*Attorney, Agent, or Firm*—Charles W. Chandler

[57] ABSTRACT

A removable fog lens attachment for an automobile headlight. The attachment includes a light-filtering panel having permanent magnets located on its rear face adjacent outer edges of the panel. The magnets are oriented so that when the attachment is moved toward the headlight front face, the magnets will magnetically lock onto the mounting frame for the headlight.

3 Claims, 1 Drawing Sheet

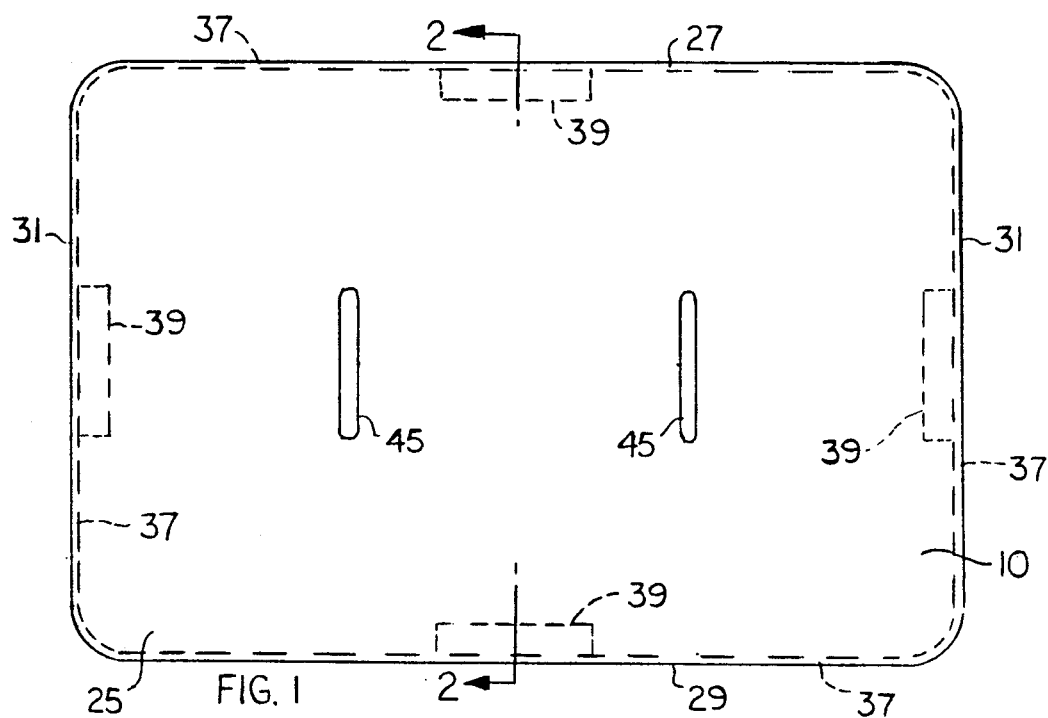
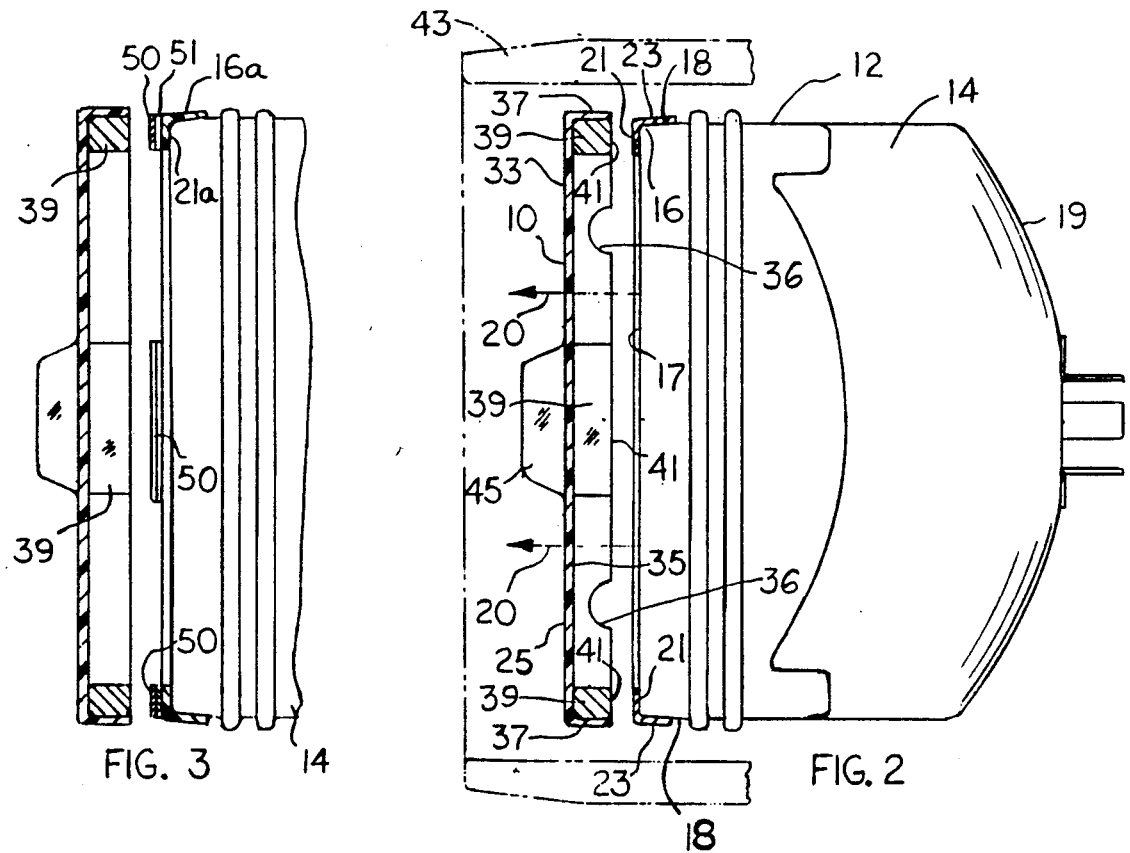

DETACHABLE AMBER LENS FOR A VEHICLE

BACKGROUND AND SUMMARY OF THE INVENTION

This invention relates to a removable fog lens attachment for an automotive headlight. The attachment comprises a colored transparent light filtering panel that is held onto a headlight by means of permanent magnets extending from the rear face of the panel. The magnets are oriented on the panel so as to register with an annular mounting frame associated with the headlight.

Fog lens attachments are shown in various patents. U.S. Pat. No. 2,530,685 to Davis et al and U.S. Pat. No. 2,544,378 to C. Cyr show fog lens panels attachable to automotive headlights through the use of suction cups carried on the rear faces of the panels.

The use of suction cups is believed to be disadvantageous in that heat generated by the headlight will tend to differentially expand the engaged surfaces so as to loosen the suction cup connection and degrade the suction cup material. The heat will also tend to expand any air contained within the suction cup, thus further weakening the connection. Also, the suction cups must be fairly large in order to develop a useful suction force. Large suction cups detract from the light-transmitting area of the headlight. Further, the glass surface must be clean in order for the suction cups to be effective against vibrational forces associated with a moving vehicle.

U.S. Pat. No. 2,539,819 shows a fog lens attachment that uses four rearwardly-extending spring clips for securing the attachment to an automotive headlight. Such clips can be used only when the headlight has an annular protruding rim structure that provides the necessary external shoulder for receiving hooked ends on the clips. Most modern automobiles have recessed headlights set back into the vehicle body, with an ornamental apertured chrome panel projecting forwardly beyond the headlight front faces. Ordinarily there is essentially no clearance between the headlight side surface and the adjacent surfaces of the ornamental apertured chrome panel. The automobile structure is such that the use of spring clips to retain a fog lens attachment on the front face of a headlight is usually not feasible.

U.S. Pat. No. 3,609,345 shows a fog lens attachment comprising a thin transparent cellophane sheet having a square outline, and a second transparent colored cellophane sheet having a circular outline. The two sheets are adhesively secured together. The circular sheet has a relatively small diameter compared to the side dimension of the square sheet, such that a peripheral surface of the square sheet is available for adhesive attachment to the mounting frame portion of the headlight.

One difficulty with the arrangement of U.S. Pat. No. 3,609,345 is that it is very difficult to precisely center the circular sheet on the headlight surface. The recessed nature of the headlights requires that the sheet assembly be pushed into the recess without a clear understanding of whether the circular sheet is precisely centered on the headlight. Another difficulty of the U.S. Pat. No. 3,609,345 arrangement is that if the circular sheet is even slightly off center relative to the face of the headlight, the headlight will appear to be misaligned relative to the headlight recess or the other headlights, thus detracting from the headlights appearance. Also, it is believed that the thin cellophane materials employed in the patented arrangement would tend to wrinkle, especially along border portions of the square sheet which must be folded to lie against inner side faces of the headlight bezel. Any wrinkling of the sheet materials will detract from the appearance of the headlight assembly.

The fog lens attachment of the present invention includes a rigid colored transparent panel having the same size and configuration as the headlight assembly so that it can fit into the recess in which the headlight is located. A number of permanent bar magnets are carried on the rear face of the panel for releasable engagement with the annular mounting frame that is used to mount the headlight within the recess in the automobile front end. The bar magnets magnetically lock onto the mounting frame to releasably attach the fog lens panel to the vehicle.

In some cases, the mounting frames for the headlights are formed of rigid plastic materials. It is contemplated that in such situations, strips of magnetically permeable material will be adhesively attached to the front faces of the plastic mounting frame to provide anchored surfaces suitable for magnetic interlock with the bar magnets carried by the fog lens panel.

IN THE DRAWINGS

FIG. 1 is a front elevational view of a fog lens attachment embodying the invention.

FIG. 2 is a sectional view taken on line 2—2 in FIG. 1. In FIG. 2, the fog lens attachment is shown displaced forwardly (leftwardly) from a conventional automotive headlight assembly.

FIG. 3 is a view taken in the same direction as FIG. 2, but illustrating another form that the invention can take.

DESCRIPTION OF A PREFERRED EMBODIMENT OF THE INVENTION

FIGS. 1 and 2 show a fog lens attachment 10 in association with an automotive headlight 12. The headlight is directly behind attachment 10 in FIG. 1, and is thus, not visible in that Figure.

Headlight 12 comprises a sealed beam unit 14 and an annular mounting frame 16 formed as a steel stamping. Frame 16 is commonly chrome plated. The sealed beam unit 14 has a front face 17 that is rectangular when viewed in the direction of FIG. 1. Four peripheral side surfaces 18 extend rearwardly (rightwardly) from front face 17 along the four edges thereof. The rear surface 19 of the sealed beam unit is convexly curved in the transverse direction to form an internal reflector, whereby light rays are emitted from the sealed beam unit in a right-to-left direction, as indicated by arrows 20 in FIG. 2.

Annular mounting frame 16 encircles the frontal edge area of the sealed beam unit. As seen in FIG. 2, the mounting frame has an L-cross section that includes a front flange 21 overlying peripheral edge areas of front face 17 and a side flange 23 extending along side surface areas 18 of the sealed beam unit. Frame 16 has ears (not shown) that are screwed onto a positioning device for the headlight assembly. Frame 16 entirely surrounds sealed beam unit 14.

Fog lens attachment 10 comprises a rigid colored transparent panel 25 having a rectangular configuration as seen in FIG. 1. Corner areas of the panel are rounded so that the panel has the same outline configuration as frame 16 and sealed beam unit 14. As viewed in FIG. 1, panel 25 has a straight upper edge 27, a straight lower edge 29, and two straight side edges 31. As viewed in FIG. 2, the panel has a front face 33 and a rear face 35. An endless peripheral flange 37 extends from rear face 35 along the four edges of the panel. Notches 36 can be formed at spaced points along flange 37 to facilitate the escape of heat when the fog lens is mounted on the front face of the headlight.

The lens is removably secured to the headlight by means of four similarly configured bar magnets 39. Each magnet has a generally square transverse cross section as viewed in FIG. 2. One flat face of each magnet is adhesively secured to face 35 of transparent panel 25. A second flat face of each magnet is adhesively secured to flange 37. A third flat face 41 of each magnet faces rearwardly (rightwardly) so as to register with front flange 21 of steel mounting frame 16 when panel 25 is axially aligned with the front face of the sealed beam unit. The lens attachment is secured to the headlight assembly by moving panel 25 rightwardly so that permanent magnets 39 magnetically lock onto frame 16.

Each magnet 39 is located midway along the respective side edges 27, 29, 31 or 31 of panel 25, so that the panel has a fairly even locking force on all four of its edges. The magnets are elongated in directions parallel to the associated side edges of panel 25, such that exposed faces 41 of the magnets are reasonably large for effective magnetic locking against flanges 21 of mounting frame 16. Each magnet surface preferably has the same width as the with of the associated flange 21, typically about one-fourth inch. Each magnet has a preferred length of about one inch. Flange 37 serves as a mounting surface and location surface for magnets 39, as well as a reinforcement for panel 25, thereby enabling the panel to be a relatively thin light weight unit.

In the newer automotive vehicles the headlights are recessed into the grille at the front end of the vehicle. Commonly, an ornamental chrome-plated panel (cover) extends across portions of the vehicle front end to frame the headlights. In FIG. 2, such a framing panel is shown in dashed lines and designated by numeral 43. The outer peripheral edges of colored lens panel 25 will be fairly close to the interior surfaces of framing panel 43, such that it becomes difficult for a person to hold onto panel 25 when moving lens attachment 10 toward or away from the headlight. To facilitate the process of installing or removing the lens attachment, two protruding ribs 45 may be formed integrally with panel 25. The person can use his thumb and first finger to grip the ribs, thereby maintaining control of the lens attachment.

In some vehicles the mounting frame for the sealed beam unit is formed out of a rigid plastic material. FIG. 3 shows a plastic mounting frame 16a. In order to permit the lens attachment of this invention to be used on the plastic mounting frame 16a, four steel strips of magnetically permeable material can be attached to the front flange 21a of frame 16a. FIG. 3 shows magnetically permeable material strips 50 having layers 51 of pressure-sensitive adhesive thereon. The four strips 50 can be adhesively secured at midpoints along each side edge of front flange 21 so as to be in registry with magnets 39 on panel 25. Each strip 50 should preferably be slightly longer than the length of the associated magnet 39 in order to compensate for deviations in placement of the strips from the desired locations on flange 21.

The lens panel construction and magnet orientation in FIG. 3 will be the same as in the structure of FIG. 2. FIG. 3 merely illustrates add-on magnetically permeable strips 50 for adapting the lens attachment to use with headlight assemblies that include mounting frames formed of plastic materials.

Having described my invention, I claim:

1. A removable fog lens attachment for a recessed automotive headlight, wherein the headlight includes a sealed beam unit having a rectangular front face and peripheral side surfaces extending generally normal to edge areas of said front face, and an annular rectangular mounting frame having an endless flat front flange overlying peripheral areas of the sealed beam unit front face, said mounting frame further including side flanges extending from outer edge areas of said front flange along the side surfaces of the sealed beam unit; said fog lens attachment comprising a flat rigid colored transparent light filtering panel having a rectangular plan configuration conforming to the plan configuration of the rectangular mounting frame; said transparent panel having an upper straight edge, a lower straight edge, and two straight side edges; said transparent panel having a flat front face, a rear face, and an endless peripheral flange extending right angularly from said rear face along the four edges of the panel; and four permanent magnets secured to the panel rear face at spaced points along the panel edges; each magnet being a straight bar magnet having a generally square cross section defining four flat faces; each bar magnet having a first flat face thereof engaged against the panel rear face, a second flat face thereof engaged against the panel peripheral flange, and a third flat face thereof in registry with the front flange of the mounting frame; said peripheral flange acting as a locator surface for the bar magnets; said four bar magnets being located midway along respective ones of the panel side edges for magnetically securing the fog lens attachment to the headlight; said magnets projecting from the panel rear face to space the rear face of said panel an appreciable distance away from the front face of the sealed beam unit; said panel and said endless peripheral flange being integrally formed as a single one piece unit whereby the flange serves as a reinforcement means for the panel.

2. The fog lens attachment of claim 1, wherein the mounting frame is formed of a plastic material; said attachment comprising four strips of magnetically permeable material attachable to the front flange of the mounting frame for cooperative locking action with the bar magnets; said magnetically permeable strips being oriented on the mounting flange so as to register with respective ones of the four permanent magnets when the transparent panel is aligned with the front frame of the sealed beam unit.

3. The fog lens attachment of claim 1 and further comprising notches formed in the endless peripheral flange to facilitate escape of heated air from the space between the rear face of the panel and the front face of the sealed beam unit.

* * * * *